(12) United States Patent
Ould et al.

(10) Patent No.: US 7,886,453 B2
(45) Date of Patent: Feb. 15, 2011

(54) METHOD FOR MEASURING A WORKPIECE USING A MACHINE TOOL

(75) Inventors: John Charles Ould, Backwell Farleigh (GB); Kevin James Tett, Bristol (GB)

(73) Assignee: Renishaw PLC, Wotton-Under-Edge (GB)

( * ) Notice: Subject to any disclaimer, the term of this patent is extended or adjusted under 35 U.S.C. 154(b) by 77 days.

(21) Appl. No.: 12/312,770

(22) PCT Filed: Dec. 11, 2007

(86) PCT No.: PCT/GB2007/004720

§ 371 (c)(1),
(2), (4) Date: May 27, 2009

(87) PCT Pub. No.: WO2008/074989

PCT Pub. Date: Jun. 26, 2008

(65) Prior Publication Data

US 2010/0050837 A1    Mar. 4, 2010

(30) Foreign Application Priority Data

Dec. 19, 2006    (GB) ................... 0625260.5

(51) Int. Cl.
*G01B 5/004*    (2006.01)
(52) U.S. Cl. .......................... 33/503; 33/556
(58) Field of Classification Search .................. 33/503, 33/556, 557, 558, 559
See application file for complete search history.

(56) References Cited

U.S. PATENT DOCUMENTS

| | | | |
|---|---|---|---|
| 4,084,323 A | 4/1978 | McMurtry | |
| 4,153,998 A | 5/1979 | McMurtry | |
| 5,222,034 A | 6/1993 | Shelton et al. | |
| 7,140,119 B2 * | 11/2006 | Badami et al. | 33/503 |
| 7,647,706 B2 * | 1/2010 | Jordil et al. | 33/503 |
| 7,676,942 B2 * | 3/2010 | Jordil et al. | 33/503 |

FOREIGN PATENT DOCUMENTS

| | | |
|---|---|---|
| EP | 0 254 515 A2 | 1/1988 |
| GB | 2 425 840 A | 11/2006 |
| JP | A-2005-345165 | 12/2005 |
| WO | WO 88/09915 | 12/1988 |
| WO | WO 95/25940 | 9/1995 |
| WO | WO 2005/031254 A1 | 4/2005 |

OTHER PUBLICATIONS

Ko et al.; "On-machine measurement using a noncontact sensor based on a CAD model;" *The International Journal of Advanced Manufacturing Technology*; 2007; pp. 739-746; vol. 32; No. 7-8.

* cited by examiner

*Primary Examiner*—Yaritza Guadalupe-McCall
(74) *Attorney, Agent, or Firm*—Oliff & Berridge PLC

(57) ABSTRACT

A method is described for measuring a workpiece on a machine tool using an analogue probe having a deflectable stylus. The method comprises the step of taking a workpiece having a nominal surface profile, the workpiece being located within the working area of the machine tool. The machine tool is used to move the analogue probe along a predetermined (known) measurement path relative to the workpiece whilst deflection of the stylus is measured. The analogue probe is moved relative to the workpiece at a speed greater than five millimeters per second and the predetermined measurement path is selected to provide intermittent contact between the stylus and the workpiece.

32 Claims, 6 Drawing Sheets

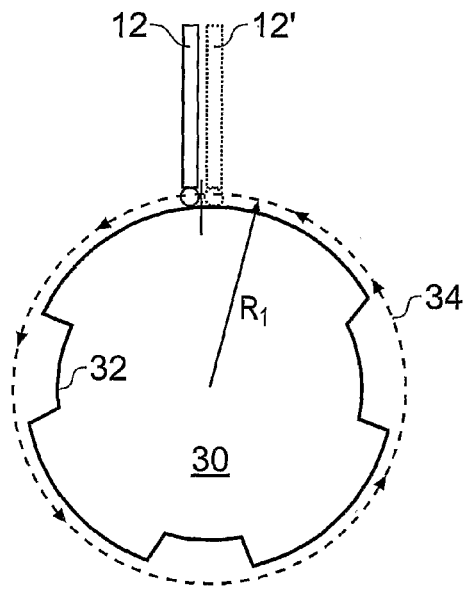
FIG. 2
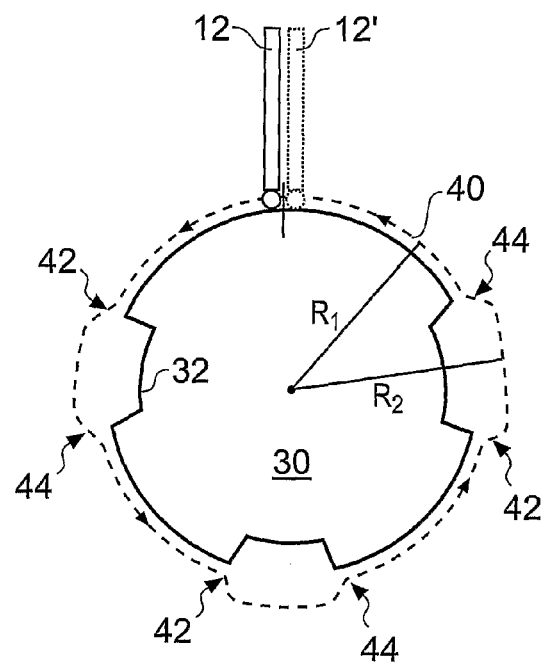
FIG. 4
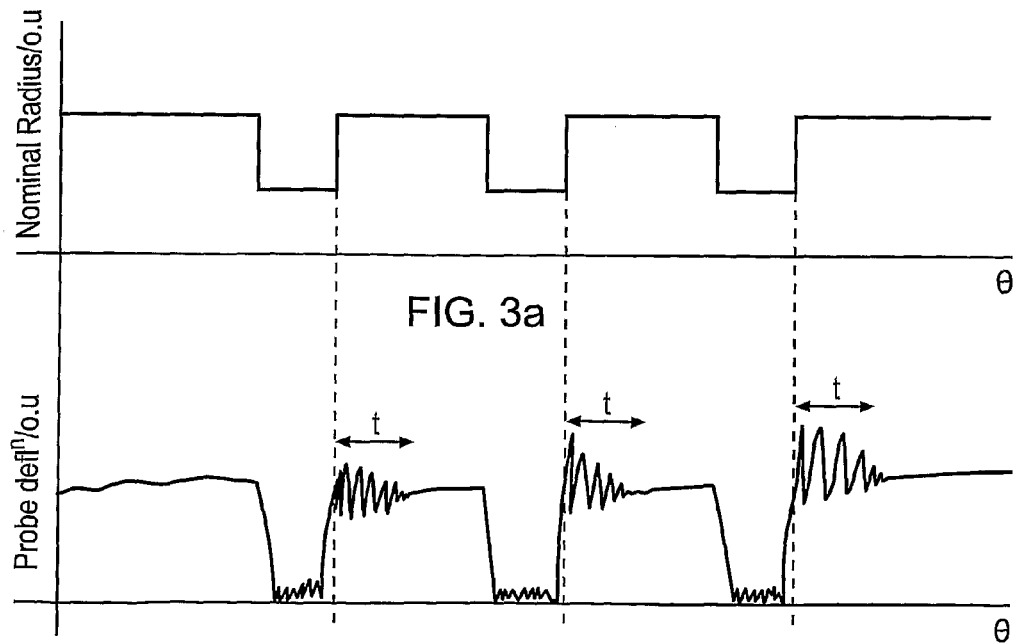
FIG. 3a
FIG. 3b

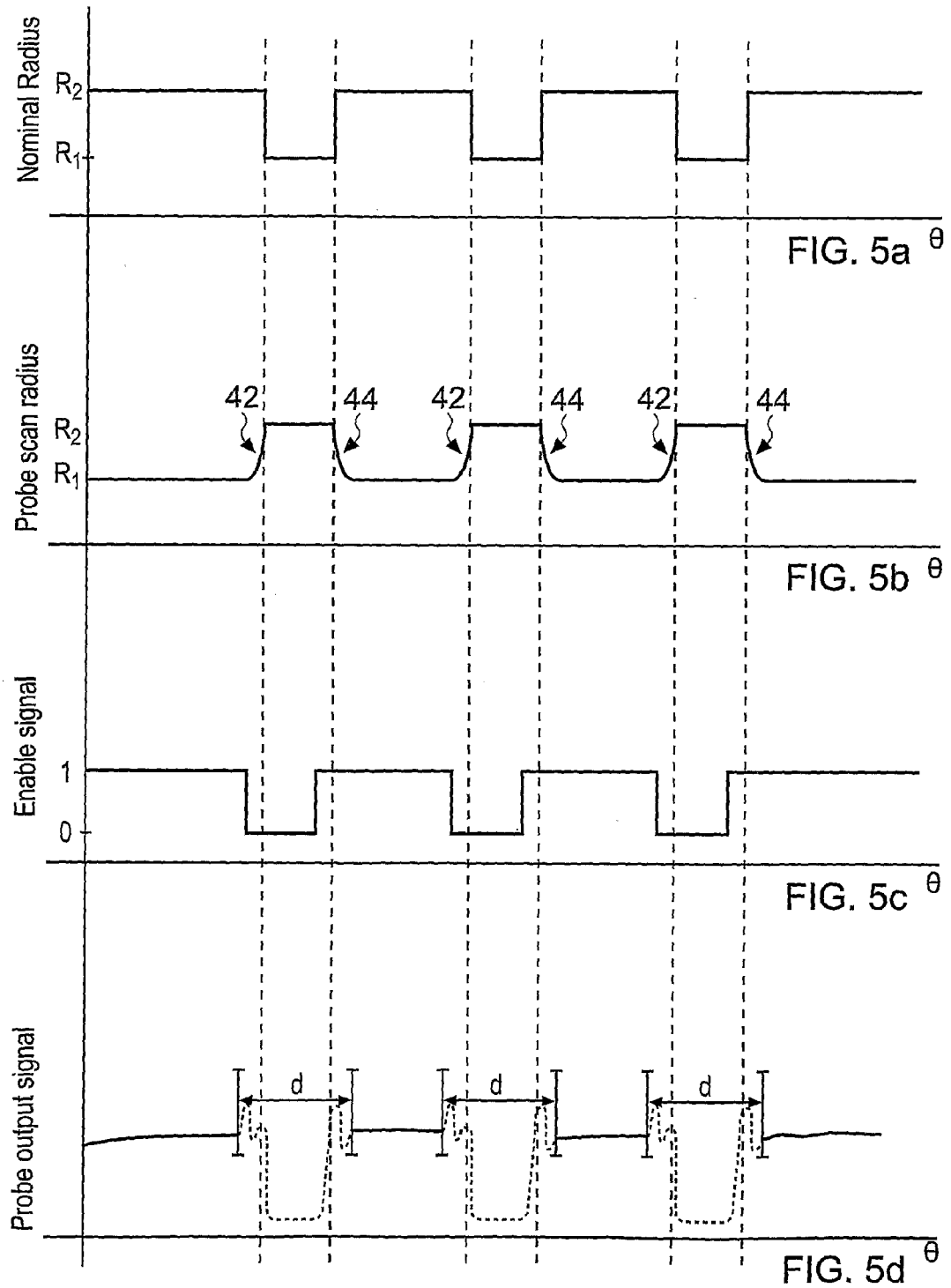

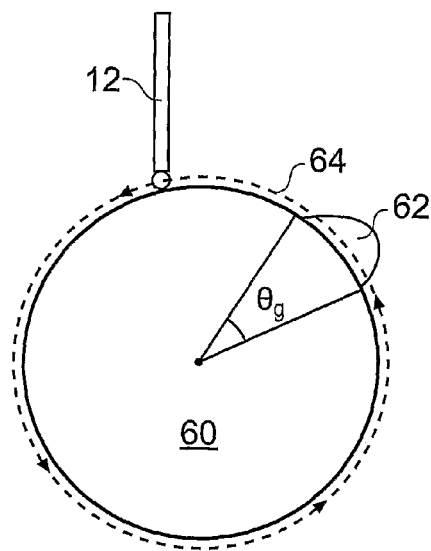
FIG. 6
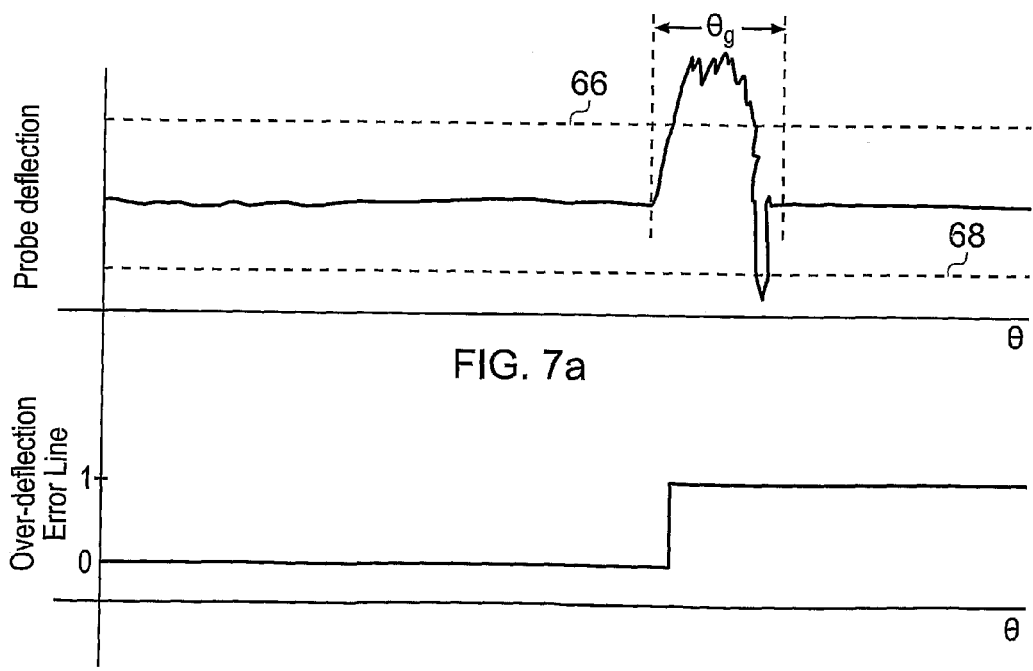
FIG. 7a
FIG. 7b

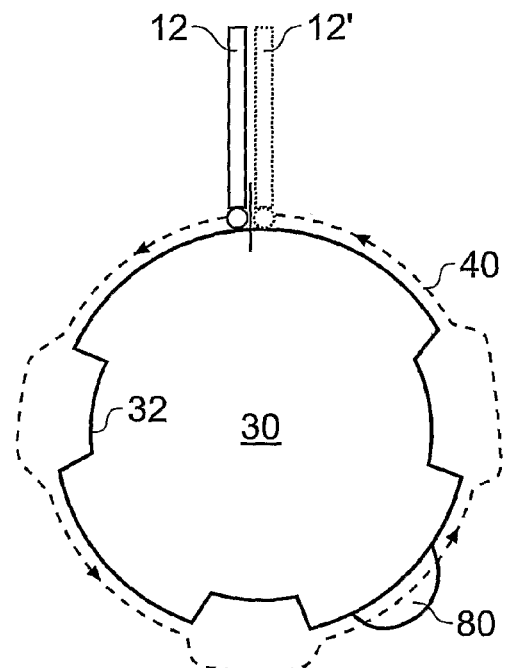
FIG. 8
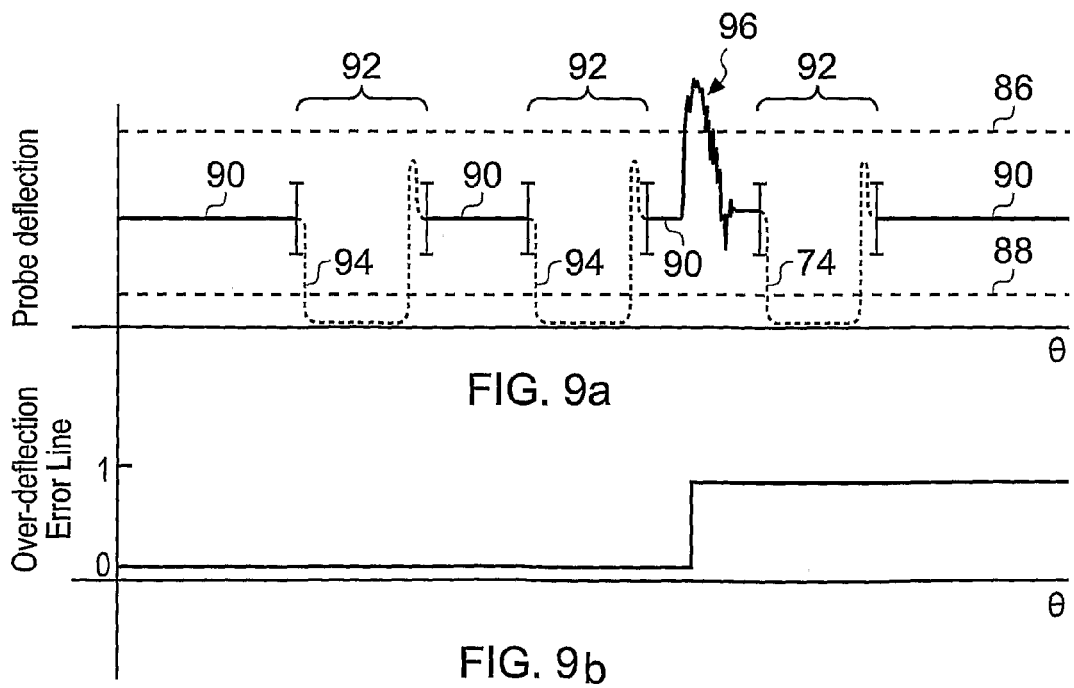
FIG. 9a
FIG. 9b

METHOD FOR MEASURING A WORKPIECE USING A MACHINE TOOL

The present invention relates to a method for scanning an object on a machine tool using an analogue measurement probe.

It is known to mount a measurement probe in a machine tool spindle, for movement with respect to a workpiece, in order to measure the workpiece. In practice, the probe has typically been a touch trigger probe, e.g. as described in U.S. Pat. No. 4,153,998 (McMurtry), which produces a trigger signal when a stylus of the probe contacts the workpiece surface. This trigger signal is taken to a so-called "skip" input of the machine tool's numeric controller (NC). In response, the controller takes an instantaneous reading of the machine's position (i.e. the position of the spindle and the probe relative to the machine). This is taken from measurement devices of the machine such as encoders which provide position feedback information in a servo control loop for the machine's movement. A disadvantage of using such a system is that the measurements are relatively slow to acquire resulting in long measurement times if a large number of measurement points are required.

Analogue or scanning measurement probes are also known. Analogue probes typically comprise a stylus for contacting the workpiece surface, and transducers within the probe which measure the deflection of the stylus relative to the probe body. An example is shown in U.S. Pat. No. 4,084,323 (McMurtry). In use, the analogue probe is moved relative to the surface of the workpiece, so that the stylus scans the surface and continuous readings are taken of the outputs of the probe transducers. Combining the probe deflection output and the machine position output allows co-ordinate data to be obtained thereby allowing the position of the workpiece surface to be found at a very large number of points throughout the scan. Analogue probes thus allow more detailed measurements of the form of the workpiece surface to be acquired than is practically possible using a touch trigger probe.

Although analogue probes have been known per se for many years, they have typically only been used with dedicated co-ordinate measuring machines (CMMs). In such CMMs, a single controller is provided to activate motors to induce movement of the measurement probe, sense movement of that probe (e.g. using encoders or the like) and also receive analogue probe measurements. This dedicated control loop arrangement allows real-time measurements of the workpiece to be attained by combining instantaneous probe position and probe deflection data. Tight control over probe positioning plus the ability to process real time stylus deflection data allows such dedicated CMMs to rapidly scan complex articles of unknown shape.

To date, analogue probes have not been widely used for machine tool scanning applications. This is due to the inherent nature of commercially available machine tools. In particular, the NCs of typical machine tools do not readily lend themselves to providing near instantaneous positional measurements to a remote computer controller. The delay in obtaining positional data from the NC thus mitigates any advantages associated with using a probe capable of providing a larger number of scanning points. In other words, the rate at which positional data can be read from the NC is the limiting factor in the rate at which machine tool measurements can be acquired. The use of analogue probes for machine tool scanning applications has thus been widely discounted as being impractical.

It is an object of the present invention to provide a method of scanning a workpiece using an analogue probe and a machine tool. It is a further object of the invention to provide an improved (e.g. faster) method of scanning a workpiece using an analogue probe mounted in the spindle of a machine tool.

According to a first aspect of the invention, a method for measuring a workpiece on a machine tool comprises the steps of; (i) taking a workpiece having a nominal surface profile, said workpiece being located within the working area of the machine tool, (ii) using the machine tool to move an analogue probe having a deflectable stylus along a predetermined measurement path relative to the workpiece, (iii) measuring deflections of the stylus of the analogue probe as said analogue probe moves along said predetermined measurement path, characterised in that step (ii) comprises moving the analogue probe relative to the workpiece at a speed greater than five millimetres per second and in that said predetermined measurement path provides intermittent contact between the stylus and the workpiece.

The present invention thus provides a method of scanning a workpiece at high speed (i.e. at a speed greater than 5 mm/sec) using an analogue, or scanning, probe mounted on a machine tool. The workpiece has a nominal shape or surface profile thereby enabling the stylus of the probe to be scanned across the surface of the workpiece along a predetermined measurement path. The method thus uses a known-path scanning technique in which deflections of the workpiece contacting stylus of the probe are measured as the predetermined measurement path is traversed. It should be noted that the machine tool may provide the relative motion between the probe and the workpiece by moving the probe relative to a static workpiece, moving the workpiece relative to a static probe or by moving both the workpiece and the probe.

As described above, the predetermined measurement path used in the method of the present invention is selected to provide intermittent contact between the stylus and the workpiece. The predetermined measurement path thus causes the stylus of the measurement probe to lift off, and re-engage, the surface of the workpiece during the measurement scan. This enables only pre-selected parts of the workpiece to be measured (e.g. certain features or sections of the workpiece having dimensions that are considered important) and arises from the recognition that it is not necessary to measure every minor feature and discontinuity of the workpiece along a certain path or contour across its surface. Instead, the measurement path is chosen to allow the probe to measure only certain pre-selected feature(s) of the workpiece.

In particular, step (ii) preferably comprises moving the analogue probe along a predetermined measurement path such that the stylus is spatially separated from the surface of the workpiece at one or more regions of the workpiece, or at each region of the workpiece, where the nominal surface profile of the workpiece exhibits a discontinuity. The scan can thus be performed at high speed without the stylus contacting some or all of the discontinuities that are expected to be present on the workpiece surface. This prevents any ringing of the stylus, or unwanted probe over-deflection, that would typically occur when a stylus tip is driven over a discontinuity at high speed.

It is preferred that the predetermined measurement path does not retract the analogue probe to a safety plane to provide said intermittent contact during the measurement scan. Instead, relative movement between the probe and the workpiece is advantageously provided such that the stylus is lifted only a short distance from the workpiece surface. Preferably, the stylus is spatially separated from the surface of the workpiece during the measurement scan by no more than 10 cm, more preferably by no more than 5 cm, more preferably by no more than 1 cm and more preferably by no more than 5 mm.

The present invention thus offers the benefit of allowing the various advantages associated with using an analogue probe (e.g. the ability to acquire a large number of measurement points) to be applied to machine tool based techniques. In particular, it allows a measurement scan to be performed at a relatively high speed thereby permitting the acquisition of large amounts of data in a reasonable period of time. The method also has the advantage of not requiring any kind of "real-time" positional information from the numerical controller (NC) of the machine tool during the scanning process (although such information is typically still required during any subsequent calculations of workpiece shape).

In summary, the present invention extends the benefits of using an analogue measurement probe to machine tools thus providing a method of machine tool scanning that allows significantly more data about the form of a workpiece to be obtained than was previously practically possible using techniques employing touch trigger probes.

It should be re-emphasised that the method of the present invention is performed using a machine tool. It is particularly important to note that the term "machine tool" as used herein comprises only apparatus that can use some kind of cutting tool or implement to machine features into a blank part or workpiece. In particular, the term machine tool as used herein specifically excludes dedicated co-ordinate measurement machines (CMMs) or the like that perform only a measurement function. Also, the term "analogue probe" is used herein to distinguish measurement probes that produce an output indicative of stylus deflection from measurement probes that merely produce a trigger signal on contact with an object. In particular, it should be noted that the output of an analogue probe may be digital or analogue.

The speed of relative motion between the analogue probe and the workpiece may vary as the predetermined measurement path is traversed. Although any changes in the direction or speed of probe travel will subject the probe to acceleration or deceleration forces, these forces can be minimised by ensuring the predetermined measurement path includes only smooth movements and that variations in speed occur relatively slowly. In other words, the predetermined measurement path is preferably selected such that movement of the analogue probe relative to the workpiece is smooth and substantially "jerk-free" such that any variations in the acceleration forces exerted on the probe are minimised.

Conveniently, step (ii) comprises moving the analogue probe relative to the workpiece at a substantially constant speed. Advantageously, step (ii) comprises moving the analogue probe relative to the workpiece at a substantially constant tangential speed. Advantageously, the speed and/or tangential speed may be maintained to within 20%, or more preferably to within 10% or more preferably to within 5%.

The acceleration forces that will occur during the measurement scan can, if required, be estimated beforehand whilst calculating the measurement path and scan speed that are to be used for the scan. If the predetermined measurement path includes curved (e.g. circular) segments of different radius, the scan speed may conveniently be selected such that the centripetal force exerted on the measurement probe is substantially constant during the scan.

Advantageously, step (ii) comprises moving the analogue probe relative to the workpiece at a speed greater than 5 mm/sec, more preferably at a speed greater than 10 mm/sec, more preferably at a speed greater than 20 mm/sec, more preferably at a speed greater than 50 mm/sec, more preferably at a speed greater than 100 mm/sec, more preferably at a speed greater than 150 mm/sec and more preferably at a speed greater than 200 mm/sec. Advantageously, the analogue probe is moved relative to the workpiece at a speed of around 250 mm/sec.

Advantageously, the predetermined measurement path is selected such that the stylus is brought back into contact with the workpiece at a shallow angle. For example, the stylus may be brought into surface contact at an angle less than 45°, or less than 30°, to the local tangent of the surface of the workpiece. Preferably, a circular move may be used to bring the stylus tip on to the surface; i.e. an "arc on" move may be used. This not only reduces the impact forces on the probe but also minimises any stylus oscillation or "bounce" that may occur shortly after the stylus makes contact with the surface.

Preferably, the predetermined measurement path comprises a closed profile portion. For example, the predetermined measurement path traced by the probe may have a common start and end point on the workpiece such that a certain area of the workpiece is enclosed by the measurement path. The predetermined measurement path may also comprise lead-in and lead-out regions along which the probe is passed to reach the common start/end point. If the measurement path comprises a closed profile portion, that portion may approximately follow a contour around the workpiece albeit with one or more regions that deviate from said contour so that the stylus is lifted slightly away from the surface. The closed profile portion may also include an overlap at the start/end point of the measurement path. For example, the predetermined measurement path may drive the probe around a circular contour "one and a bit" times. The amount of such overlap may be selected as required.

It should be noted that open profile scanning is also possible using the present invention. For example, the predetermined measurement path may extend (e.g. approximately linearly) from one region of the workpiece to another.

Advantageously, the analogue probe is arranged to output deflection data relating to stylus deflection. Preferably, the method comprises the step of outputting said deflection data to an associated interface over a wireless (e.g. RF or optical) communications link. In this manner, stylus deflection data may be output from the probe without being routed via any part of the control electronics of the machine tool. This permits rapid data transfer; e.g. data points may be transmitted every few milliseconds. The provision of such a wireless link is especially advantageous for machine tools because it is typically not possible to establish a reliable hard wired link to the probe via a standard machine tool spindle, especially if an automatic tool changer is used.

Conveniently, the method comprises the step of generating an enable signal that indicates when contact between the stylus and the workpiece surface is expected. For example, the enable signal may be activated (e.g. held high) when contact is expected and deactivated (e.g. held low) when no contact is expected.

Advantageously, the enable signal is arranged to be output prior to (e.g. a few milliseconds before) the expected surface contact being made or broken.

The step of generating an enable signal may be performed by the NC of the machine tool; e.g. the NC may output an enable signal in parallel with issuing a certain movement command to the motors of the machine tool. It should, however, be noted that the timing of such an enable signal is based on the issuance of a "move" command by the NC and is not an accurately timed indication of machine position. The enable signal thus provides only a rough (e.g. to within 10 ms) indication of when surface contact is expected to be made or broken. As described below, this enable signal may be used as a flag that the stylus is expected to engage, or lift from, the surface in the very near future.

Advantageously, the method comprises the step of calculating when clean surface contact is made, and/or lost, by analysing the stylus deflection data generated by the probe. It should be noted that "clean contact" occurs when the stylus deflection measurements accurately represent the surface form of the workpiece. Clean contact may thus occur shortly after the stylus first contacts the workpiece surface; e.g. when enough time has elapsed for the stylus to settle into good contact with the surface. Conveniently, stylus deflection data is output only when clean contact between the stylus and the workpiece surface occurs.

The step of outputting stylus deflection data only when clean contact between the stylus and the workpiece surface occurs may advantageously comprise using the enable signal generated by the NC. In other words, the enable signal may be used to initiate a further step of determining when clean contact of the stylus with the surface has been made or lost. This means that assessing probe deflection data to ascertain if there is clean contact between the stylus and surface is only necessary for a short time after a change in the state of the enable signal. Finding the periods of clean contact in such a manner allows any stylus deflection data that is not representative of surface measurements to be ignored during subsequent analysis of the measured surface data. For example, only probe deflection data that corresponds to periods in which clean contact occurs may be output. Alternatively, probe deflection data may be accompanied by a signal or marker that indicates when there is clean contact between the stylus and workpiece surface.

Although the expected or nominal surface profile of the workpiece is known, the actual workpiece that is produced may not always have a surface profile within the tolerances expected. Although the above described method can measure minor deviations from the required or nominal shape, it is possible that gross errors may also be found during the measuring process. For example, a broken or damaged tool may severely effect the shape of the workpiece that is formed. Furthermore, it is also possible that waste material from the machining process may attach itself to the workpiece thereby altering the surface profile that is measured by the analogue probe during the measurement scan.

In order to detect gross errors of this type, the method preferably comprises the step of comparing the stylus deflection measured in step (iii) to at least one of an upper stylus deflection threshold and a lower stylus deflection threshold. The upper and lower stylus deflection thresholds are conveniently set to bracket the expected range of stylus deflections. The expected range of stylus deflection can be determined for a given predetermined measurement path taking into account normal machining tolerances. Alternatively, the predetermined measurement path may be selected such that the stylus deflection falls within a certain range assuming a certain level of machining error. The step may also be performed of generating an error signal when the stylus deflection is greater than the upper threshold and/or less than the lower threshold as appropriate.

Advantageously, the step of comparing stylus deflection data to an upper stylus deflection threshold occurs in real time. For example, the probe itself may be arranged to continually compare the stylus deflection data to an upper limit. If the upper stylus deflection threshold is exceeded, an over-deflection error signal may be generated that is passed to the machine tool to immediately stop the measurement scan and to withdraw the probe from the workpiece. The over-deflection error signal may thus cause the NC to immediately execute a so-called "stop and withdraw" instruction. This emergency stop due to probe over-deflection may be implemented using a configurable user input of the NC; e.g. via the user interrupts of a Fanuc or Mazak controller that are presently termed the "UINT" and "UIT" lines respectively or via a standard digital input on a Siemens 840D controller that triggers an asynchronous action.

Monitoring over-deflection of the stylus in this manner allows error detection to be performed at the rate at which probe deflection data is collected. Importantly, such a method does not require any additional information about the position of the probe within the machine co-ordinate system. This monitoring of stylus over-deflection in substantially real time is advantageous because it can immediately indicate that a gross error has occurred thereby allowing the machine to be stopped thus reducing the risk of any damage to the probe and/or machine tool.

Unlike over-deflection, an under-deflection gross error is unlikely to cause any damage to the measurement probe, workpiece or machine tool. The comparison of probe deflection data to the lower deflection threshold can thus be performed in slightly slower time; e.g. in "near-real" time. For example, the comparison may be performed on each packet of stylus deflection data that is periodically transmitted (e.g. every 50 ms) from the probe to the probe interface. The scan may also be permitted to continue even in the presence of a gross under-deflection error in order to ascertain more information about the form of that error. The method may thus comprise the step of generating an under-deflection error signal if the stylus deflection drops below the lower threshold. It should be noted that although slower than the over-deflection error checking process, such under-deflection monitoring can still occur at a much faster rate than any error monitoring technique that requires positional information from the machine tool.

As described above, the predetermined measurement path used in the method of the present invention causes intermittent contact between the stylus and the workpiece surface. The gross error checking method is thus preferably performed so as to indicate only those gross errors that occur whilst clean stylus contact with the workpiece surface is expected. Any gross over-deflection or under-deflection errors that occur whilst the stylus does not properly contact the surface, or whilst-it is being driven into or away from the surface, may be ignored. These ignored errors can be considered as known gross errors; i.e. they are expected given the predetermined measurement path.

The method may thus comprise the step of generating a gross error signal only when clean contact between the stylus and workpiece surface is expected. For example, gross error monitoring may occur after clean surface contact has been detected until the enable signal is deactivated thereby indicating that surface contact is soon to be lost. If separate over-deflection and under-deflection monitoring is implemented, the over-deflection monitoring may conveniently be performed continuously whilst under-deflection monitoring may occur only whilst clean surface contact is established.

Advantageously, the method may include a step of performing a recovery action when an error signal (e.g. an over-deflection or under-deflection error signal) is generated. For example, an over-deflection error signal passed to the appropriate input of the NC may cause the machine to stop immediately (as described above) and may also alter the NC program flow (e.g. like an asynchronous subroutine on a Siemens controller or a subprogram call on a Fanuc or Mitsubishi controller) so as to perform the recovery action.

A variety of recovery actions may be used. For example, the recovery action may comprise at least one of (a) cleaning or washing said workpiece (e.g. using a jet of machine coolant or a blast of air), (b) re-machining said workpiece (possibly using a different tool), (c) altering or resetting the position of the workpiece within the machine tool work area and (d) regenerating the predetermined measurement path. If recovery action (d) is selected, the new predetermined measurement path may be calculated using at least some of the data acquired during the previous measurement scan. The recovery action may also be user definable and run as appropriate for the particular cutting application. For example, it may comprise checking the tool for tool breakage, taking measurements with a different probe, or raising an alarm to alert the user.

After one or more recovery actions have been taken, a step of re-measuring the workpiece may be performed. This may be performed using the same method, possibly with a regenerated predetermined measurement path, that was used for the initial measurement. The step of performing a recovery action and re-measuring the workpiece may be performed a set number of times. Each recovery action may be performed once, or more than once, as required. These recovery actions may be performed in a predetermined sequence or based on information about the error that has been encountered. If the recovery actions are unsuccessful, an operator warning may be provided.

The above described method may be executed using a variety of different hardware implementations. For example, the front-end computer of the machine tool may be interfaced to both the NC and the analogue probe (e.g. via a probe interface that includes a wireless communications link as described above). The method may then be performed under the direction of the front-end computer. In such an example, step (ii) of the method may conveniently comprise programming the numeric controller of the machine tool with said predetermined measurement path.

The method may conveniently comprise the step of calculating the predetermined measurement path used in step (ii) from the nominal shape of workpiece. This calculation of the predetermined measurement path may be performed by the front-end computer or by a separate computer (e.g. the computer on which the computer aided design software is used to define the shape of the workpiece to be generated during the machining process). If required, the method may comprise the step of measuring a few points on the workpiece to aid calculation of the predetermined measurement path. For example, the analogue probe could be used in a touch trigger mode to obtain a small number of measurements of workpiece position or form.

Once stylus deflection data has been acquired by tracing the probe along the predetermined measurement path, such data may be combined with probe position data from the NC so that the shape of features of the workpiece can be determined. The method may thus comprise the step of determining the shape of at least one feature of the workpiece by combining stylus deflection data with data relating to the measured or calculated position of the probe relative to the workpiece. This processing does not have to be, and due to the above described limitations of the NC typically can not readily be, performed in real time. The combination of the probe position and probe stylus data may thus be performed after the measurement scan has been performed. Once the workpiece shape has been established, it may be compared to the nominal workpiece shape.

For complex parts, it may be wished to measure a number of different surface features. The method may thus include repeating steps (ii) and (iii) using one or more different predetermined measurement paths. In other words, the method may involve using, sequentially, a plurality of predetermined measurement paths.

Advantageously, an initial step is performed of using the machine tool to cut a blank so as to form said workpiece having a nominal surface profile. The cutting tool used to machine the workpiece can then be substituted for the analogue probe that is used to measure that workpiece. To allow automated operation, the method may comprise the step of providing an automated tool changer such that any one of a measurement probe and one or more cutting tools may be placed in the spindle of said machine tool.

Advantageously, a computer program may be provided that allows the above method to be implemented by a machine tool. The computer program may be arranged to generate, when executed by a suitable computer, a predetermined measurement path for a given workpiece that will provide intermittent contact between the stylus of an analogue measurement probe and the workpiece when implemented by a suitable machine tool. The computer program may also be arranged so that, when executed by a suitable computer, appropriate commands are output that cause an associated machine tool to move the analogue probe along the predetermined measurement path relative to the workpiece at a speed greater than five millimetres per second. A computer program carrier may also be provided that contains said computer program in a machine readable form.

A machine tool may also be provided that is configured to perform the above method.

According to a second aspect of the invention, machine tool apparatus comprises a workpiece holder, an analogue probe having a deflectable stylus, drive means (e.g. one or more motors) for moving the analogue probe along a predetermined measurement path relative to the workpiece holder, and measurement means for measuring deflections of the stylus of the analogue probe as said probe is moved along said predetermined measurement path, wherein when a workpiece is held by the workpiece holder the drive means is arranged to move the analogue probe along a predetermined measurement path at a speed greater than five millimetres per second, wherein the predetermined measurement path is selected to provide intermittent contact between the stylus and the workpiece.

According to a further aspect of the invention, a method of monitoring errors arising when measuring a workpiece on a machine tool comprises the steps of; (i) locating a workpiece having a nominal surface profile within the working area of a machine tool, (ii) using the machine tool to move an analogue probe having a deflectable stylus along a predetermined measurement path relative to the workpiece, (iii) measuring deflections of the stylus of the analogue probe as said probe is moved along said predetermined measurement path, characterised in that the method comprises the step of comparing the measured stylus deflection to at least one of an upper deflection threshold and a lower deflection threshold.

The thresholds may be set to bracket the expected range of stylus deflections. The step of generating an error signal when the stylus deflection is greater than the upper threshold or less than the lower threshold may also be performed. It should be noted that this method may be performed as part of an intermittent scan of the type described above or during any other type of measurement scan. Further preferred features of such a gross error detection method are outlined above.

According to a further aspect of the invention, an analogue probe comprises a stylus holder for retaining a stylus and means for measuring deflections of the stylus holder, wherein the probe comprises error detecting means for comparing deflection of the stylus holder to at least one of an upper deflection threshold and a lower deflection threshold.

The invention will now be described, by way of example only, with reference to the accompanying drawings in which;

FIG. 2 illustrates a cog and a circular scanning path,

FIG. 3 is a plot of scan properties associated with the scan shown in FIG. 2,

FIG. 4 illustrates a cog and a further interrupted scan path,

FIG. 5 is a plot of scan properties associated with the scan shown in FIG. 4,

FIG. 6 illustrates an nominally circular object having an unexpected feature,

FIG. 7 is a plot of scan properties associated with the scan shown in FIG. 6 for detecting gross errors, FIG. 8 illustrates a cog having an unexpected feature, FIG. 9 is a plot of scan properties associated with the scan shown in FIG. 8 for detecting gross errors.

Figure 1:
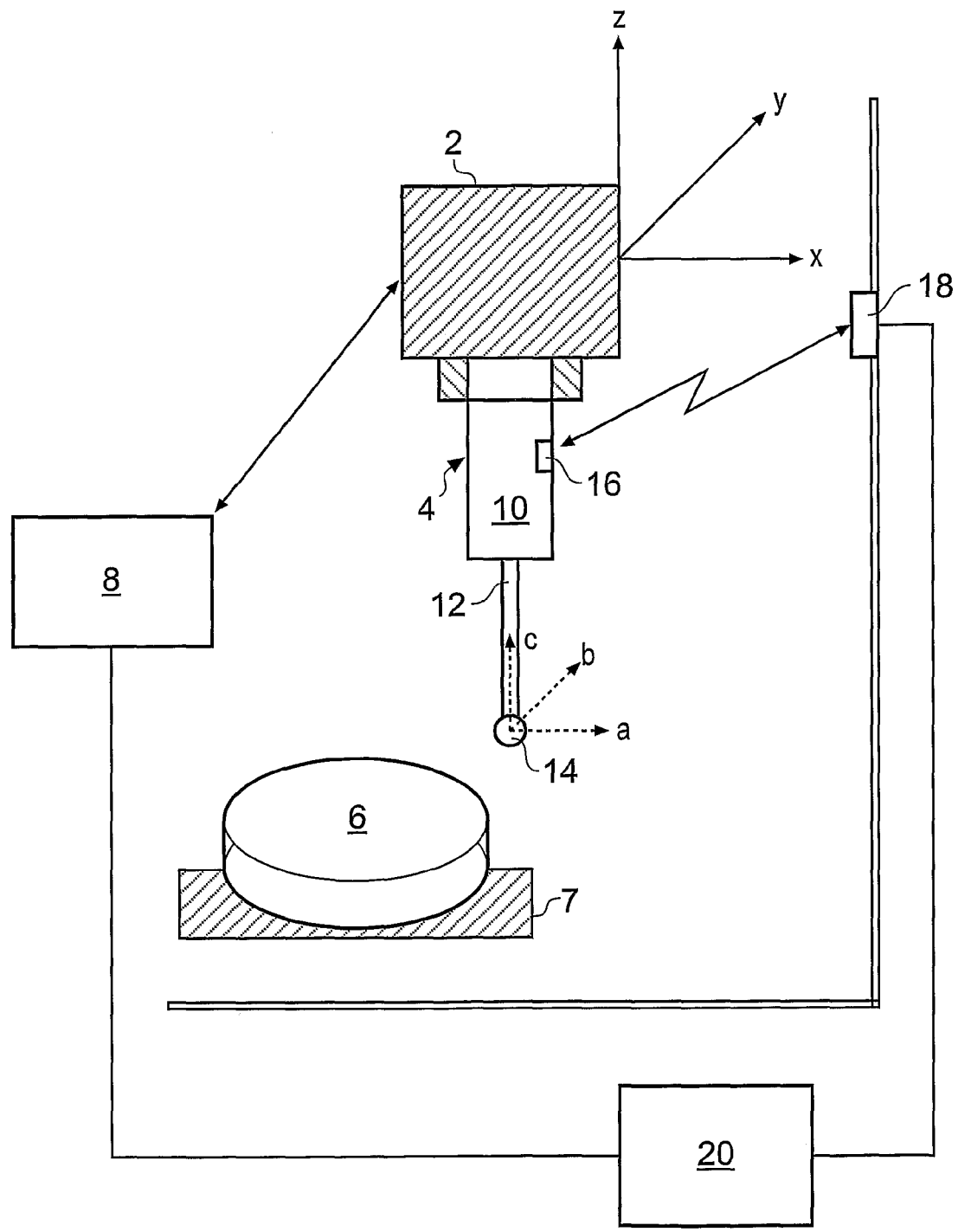
FIG. 1 shows a machine tool carrying an analogue probe.

Referring to FIG. 1, a machine tool is illustrated having a spindle 2 holding an analogue probe 4.

The machine tool comprises known means, such as one or more motors (not shown), for moving the spindle 2 relative to a workpiece 6 located on a workpiece holder 7 within the work area of the machine tool. The location of the spindle within the work area of the machine is also accurately measured in a known manner using encoders or the like; such measurements provide spindle position data defined in the machine co-ordinate system (x,y,z). A numerical controller (NC) 8 of the machine tool controls (x,y,z) movement of the spindle 2 within the work area of the machine tool and also receives feedback relating to spindle position.

The analogue probe 4 comprises a probe body 10 that is attached to the spindle 2 of the machine tool using a standard releasable connector. The probe 4 also comprises a workpiece contacting stylus 12 that protrudes from the housing. A ruby stylus ball 14 is provided at the distal end of the stylus 12 for contacting the associated workpiece 6. The analogue probe 4 measures any deflections of its stylus ball 14 in the probe geometry system (a, b; c). The probe 4 also comprises a transmitter/receiver portion 16 that communicates with a corresponding receiver/transmitter portion of a remote interface 18. In this manner, probe deflection (a,b,c) data from the probe is output over a wireless communications link.

Spindle position data (x,y,z) from the machine tool's NC 8 and probe deflection data (a,b,c) collected by the probe interface 18 are passed to the machine tool's front-end computer 20. The computer 20 combines the spindle position data (x,y,z) and the probe deflection data (a,b,c) to provide a set of measurements that define the position of a surface within the machine co-ordinate geometry.

It is important to note that data relating to probe deflection (i.e. a,b,c data values) are passed to the computer 20 in data packets every few milliseconds. In contrast, it can take several seconds or more for positional (x,y,z) data to be output from the NC of the machine tool. Although the computer 20 can take account of any relative time delays when combining the probe and NC data, the data processing calculations that are required can take upwards of 30 seconds to perform. It has thus been found that it is simply not possible to establish a real time control loop for adjusting probe position in response to measured probe deflection whilst maintaining a practical (i.e. sufficiently high) scan speed. For this reason, those skilled in the art have widely discounted the use of analogue probes for machine tool measurement applications.

To implement a measurement method using apparatus of the type illustrated in FIG. 1, it has been found that a known-path scanning technique can be used in which only intermittent contact is provided between the stylus and the workpiece. In particular, it has been recognised that it is not always necessary to obtain data relating to the entire surface profile of a workpiece. For example, it is typically only necessary to measure certain sections of the surface profile in order to obtain information that is representative of deviations of the shape of the whole machined workpiece away from its nominal, or designed, shape. It has also been found that such known-path scanning techniques can be applied to measuring surface profiles having one or more discontinuities; e.g. surfaces having sharp edges, recesses or protrusions formed in an otherwise smooth surface.

Referring to FIG. 2, a workpiece 30 is shown that takes the form of a cog having a nominal surface profile 32. The variation in radius of the workpiece 30 is also illustrated in the plot shown in FIG. 3a. The dashed line 34 shown in FIG. 2 illustrates a circular predetermined measurement or scan path that the stylus of the probe would traverse in the absence of a workpiece.

The circular predetermined measurement path shown in FIG. 2 could be traversed at a constant scan speed by the analogue probe. However, as shown in the illustrative probe deflection data of FIG. 3b, the stylus of the probe would then impact the side wall of the indentation formed in the workpiece and would thereafter vibrate or "ring" for a certain period of time before continuous, clean, contact is re-established with the surface. For a given scan speed, this would result in the loss of accurate probe deflection data across the angular range "t" shown in FIG. 3b. In other words, there would be a certain period of time in which the stylus bounces on and off the surface of the workpiece after contact is re-established with the surface. It can thus be seen that defining a simple measurement path (e.g. a circle) allows certain sections of the surface profile to be measured but can still result in some loss of data or the need to use a slower scan speed.

Following the above, the present inventors have refined the scanning process to maximise the amount of measurement data that can be acquired whilst still allowing the probe to be moved along the measurement path at a relatively high speed. This is achieved by lifting the stylus slightly away from the workpiece surface prior to it reaching a surface discontinuity and will be described in more detail.

Referring to FIG. 4, a known-path scanning technique of the present invention is described for measuring surface profile properties of a workpiece 30. The dashed line represents the predetermined measurement path 40 that would be traced by the centre of stylus tip of the analogue probe in the absence of a workpiece. This information is also shown in FIGS. 5a and 5b which plot the radius of the workpiece 30 and the radius of the measurement path 40 as a function of the angle around the workpiece.

The measurement path 40 illustrated in FIG. 4 and plotted in FIG. 5b can be seen to comprise parts that have a first radius $R_1$ and a second radius $R_2$. The parts of the measurement path having the radius $R_1$ coincide with the outer surface of the workpiece 30 whereas the parts of the measurement path having a radius $R_2$ coincide with the recesses in the workpiece surface. The transition between the parts of the measurement path having different radii (i.e. regions 42 and 44) is arced.

The measurement path 40 thus causes the probe stylus to be lifted from the surface of the workpiece just before the stylus reaches a recess in the workpiece. Furthermore, bringing the stylus back onto the surface of the workpiece via such an angled (arced) measurement path minimises any stylus bouncing effects that may occur.

In use, the NC of the machine tool can be pre-programmed such that the probe traces the measurement path 40 at a high speed; for example, a scan speed of around 250 millimetres per second can be used for large features. Furthermore, "arcing" on and off the workpiece surface in this manner allows the measurement scan to be performed without having to rapidly slow down, or speed up, the measurement probe. In other words, the probe motion is smooth or substantially "jerk" free thereby minimising acceleration effects that may induce unwanted probe deflections. In particular, the tangential speed may be kept substantially constant. This scanning method can thus be seen to permit a high speed scan of a workpiece to be performed using an analogue probe mounted in the spindle of a machine tool.

Although the analogue probe acquires stylus deflection data for the duration of the scan, the NC is arranged to generate an enable signal that allows the probe output to be gated to output only those surface measurements which are substantially error free. In this example, an enable signal of the type shown in FIG. 5c is generated by the NC using the known-path properties. This enable signal is switched high (enabled) when the stylus is about to contact the surface of the workpiece and switched low (disabled) just before the stylus is expected to lose contact with the surface of the workpiece.

The enable signal generated by the NC is passed to the probe and used in the process of establishing when clean contact between the probe and the workpiece surface is present. In particular, the probe is arranged to monitor stylus deflection data for the loss, or attainment, of clean surface contact for a short period of time after the enable signal is switched high-low, or low-high, as appropriate. This is achieved by comparing expected stylus deflection to actual stylus deflection and/or by looking at variations in stylus deflection between adjacent data points.

FIG. 5d shows the measured stylus deflection as a function of scan angle for the intermittent scan. The regions "d" shown in FIG. 5d illustrate the regions in which the stylus deflection data is not output by the probe because there is no clean contact between the stylus and the surface.

It should be remembered that the precise timing of the enable signal generated by a typical NC will be uncertain because movement of the machine tool is not synchronised with the generation of the hardware enable signal. Also, as described above, the stylus may be arced on and off the surface to minimise surface bounce effects. In such an example, the enable signal may be raised (enabled) during the arc on move, as close to the surface as possible, but before the start of the measurement. When arcing off the surface, the enable signal may be lowered (disabled) as soon after finishing the measurement as possible, again allowing for the timing uncertainty. It is possible, to ensure the collection of as much measurement data as possible, to command the enable signal high (enabled) at the start of the arc on movement and low (disabled) at the end of the arc off move.

In such an example, the under-deflection error signal may be generated when the probe state goes from deflected (e.g. above the under-deflected threshold for a plurality of consecutive samples), to under-deflected (i.e. below the under-deflected threshold) and then to deflected again. This accounts for any data that are collected slightly before initial surface contact is made and after the probe stylus has been lifted from the surface. Monitoring when deflection has occurred for a plurality of consecutive samples also accounts for any oscillation of the probe output above and below the under deflection threshold. A certain amount of hysteresis may also be provided when determining if the probe is deflected or under-deflected. For example, the probe may be considered "deflected" after it goes above a deflected threshold that is slightly higher than the under-deflected threshold and may be deemed to be in such a deflected state until it goes below the under-deflected threshold.

The above described method relies on being able to pre-calculate a measurement path around which the probe can be driven. In such methods, it is necessary to know to a good approximation the shape of the workpiece that is being scanned; the scanning process can then measure any minor deviations from that ideal shape. The above method thus relies on the assumption that the workpiece machining method can produce workpieces that have the general form that is required and are located within the machine tool working area in a known position and orientation. However, this may not always be the case. For example, tool breakage or defects within the workpiece blank may cause unexpected and large variations in shape. Also, the position or orientation of the workpiece may alter between the machining and scanning processes or foreign objects (e.g. detritus from the machining process) may become somehow attached to the workpiece before the scanning method is implemented. These gross errors may be detected during scanning using the method described below.

Referring to FIG. 6, a circular workpiece 60 is shown having an unwanted portion of material 62 attached thereto. The portion of material 62 may, for example, be a piece of waste material generated during the machining process. The measurement path 64 along which the probe is driven will necessarily have been calculated only from knowledge of the expected (circular) shape of the part and thus passes straight through the portion of material 62.

FIG. 7a shows the probe deflection output as a function of the angular orientation of the probe around the measurement path 64. It can be seen that in the region of the portion of material 62, the stylus deflection is significantly greater than expected and may approach, or even exceed, the maximum measurable stylus deflection. Monitoring the probe deflection relative to an upper threshold 66 and a lower threshold 68 thus allows an error signal to be generated when one of these thresholds is crossed.

In this example, over-deflection and under-deflection errors are monitored separately. The stylus deflection is continually compared to the upper threshold 66 by an appropriate comparator circuit provided within the probe. The probe also has an over deflection error output that generates an error signal as soon as the upper threshold is exceeded; see FIG. 7b. This over-deflection gross error signal may be fed to an interrupt of the machine tool so that, if required, the measurement process can be immediately stopped if over-deflection is detected. This process is performed in near real time (i.e. at the rate of data generation) and can thus prevent probe (or machine) damage resulting from over-deflection.

Comparison of the stylus deflection to the lower threshold 68 is performed in slower time on each data point contained in packets of stylus deflection data that are received by the controlling computer. For example, the comparison may be performed on each data point within 50 ms blocks of data received by the computer. As under-deflection will not typically cause any damage to the machine tool or probe, the under-deflection error is not immediately passed to an interrupt, but is received and appropriately processed by the control routines of the computer.

The above described method allows errors to be determined from monitoring probe deflection alone (i.e. without any knowledge of machine position co-ordinates). These error signals can thus be generated in real time (e.g. at the rate of probe deflection data) or in near real time (e.g. on small packets of data). In particular, the error calculations do not need to wait for the machine position (x,y,z) and probe deflection (a,b,c) data to be combined. This faster generation of errors allows the scan speed to be increased accordingly.

If an error signal (e.g. an over-deflection error or an under-deflection error) is generated during the scanning step, one or more recovery actions may be performed to attempt to remove the source of error. For example, the workpiece could be washed using coolant liquid to try to remove any unwanted pieces of contamination that have become attached to the workpiece. Alternatively, part of the machining process could be repeated, possibly after checking the state of the cutting tool that was used for that process. The computer may also be arranged to regenerate the predetermined measurement path, possibly taking into account any measurements acquired during the previous measurement scan.

The recovery processes may be performed automatically, for example under the direction of a computer. After some, or all, of the recovery actions have been implemented the measurement scan can be repeated to assess if the source of the gross error is still present. The steps of performing one or more recovery actions and taking a measurement scan may be repeated, in turn, a number of times. If the automated recovery actions fail to remove the gross error, an alarm or other warning signal could be provided to alert the machine tool operator to the potential problem.

Referring now to FIGS. 8 and 9, a method will be described in which the interrupted profile scanning and gross error detection methods described above are combined.

FIG. 8 illustrates the workpiece 30 in the form of a cog having a surface profile 32. A predetermined measurement path 40 is also shown. The form of the workpiece 30 is identical to that described above with reference to FIG. 4 but with an additional, unexpected, portion of material 80 attached to the outer surface. The pre-calculated measurement path 40 is determined without knowledge of the additional portion of material 80 and hence the probe is driven by the machine tool along the same measurement path 40 as shown in FIG. 4.

FIG. 9a shows the stylus deflection of the measurement probe as a function of the angle around the workpiece. In particular, the stylus deflection will include portions shown as solid lines 90 in which the stylus is expected to be in contact with the surface of the workpiece. As described above, there will also be angular ranges 92 during which the probe is lifted away from the surface or is in the process of moving towards, or away from, the surface. The stylus deflection in these regions is shown as dashed lines 94 in FIG. 9a but, as noted above, these data points may be removed from the resultant probe output by gating the probe deflection data so that data is only output when clean surface contact is present.

During scanning of the workpiece shown in FIG. 8, the probe stylus will also contact the additional material 80 resulting in additional, unexpected, stylus deflection. This will produce a gross measurement error (i.e. deflection peak 96) that can be detected in the manner described above by comparing the stylus deflection to upper and lower thresholds 86 and 88. An over-deflection error signal will thus be produced as shown in FIG. 9b when the upper threshold is crossed.

It should be noted that stylus deflection is likely to exceed the lower threshold 88 several times whilst the stylus is passing through the angular regions 92 (i.e. as the stylus is arced away from and back on to the workpiece surface). To ensure such expected probe under-deflections do not trigger an error signal, the comparison of the probe deflection signal to the lower threshold 88 only occurs outside of the angular regions 92. In other words, under-deflection error detection is only applied to probe deflection measurements from regions in which the stylus is expected to be in contact with the surface of the workpiece. Over-deflection is, however, continually monitored; i.e. the deflection data is continually compared to the upper threshold 86 by the probe.

Once a gross error (under-deflection or over-deflection) has been detected, recovery action may be taken as described above.

Figure 10:
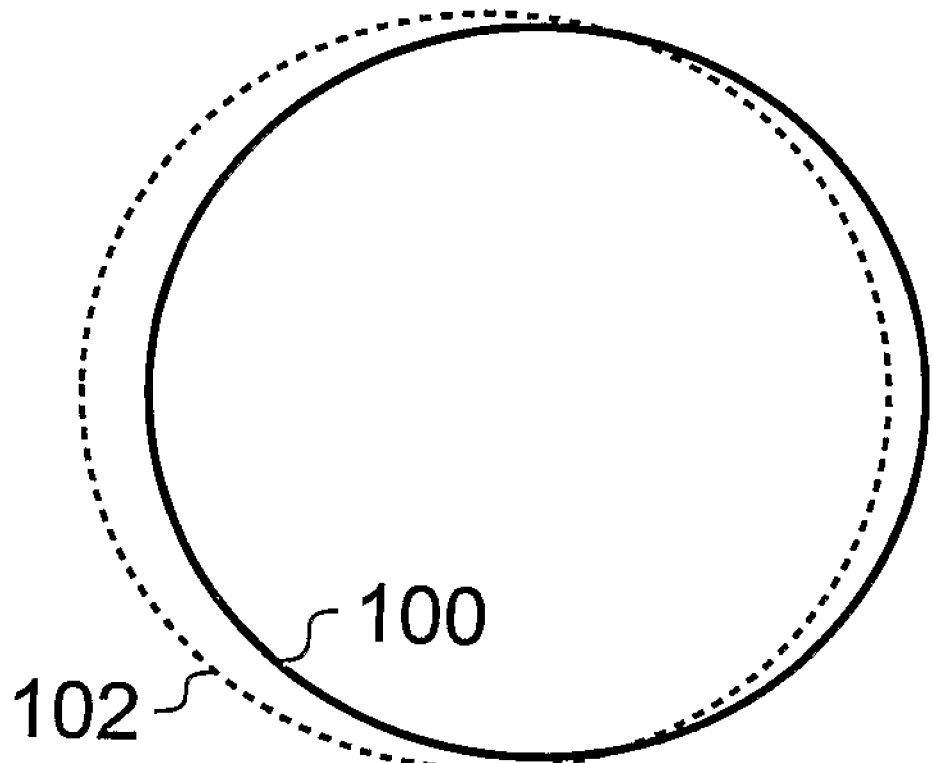
FIG. 10 illustrates measurement of an offset workpiece.

Referring to FIG. 10, it should also be noted that gross error detection of the type described above can be used to detect any deviations in the expected position of the workpiece within the machine tool co-ordinate system.

FIG. 10 shows a circular workpiece 100 having a centre that is offset from the expected centre. This results in the calculated measurement path 102 (i.e. the measurement path calculated using the expected centre position) and the workpiece 100 being non-concentric. At different parts of the scanning process, the expected stylus deflection will move above and below the defined upper and lower threshold limits thereby producing gross error signals. One of the above mentioned recovery actions could thus be to re-centre the workpiece or to regenerate the predetermined measurement path to take account of workpiece position.

It should be noted that although the above examples use workpieces of relatively simple shape, the technique could be applied to a workpiece of any shape. In addition, the machine tool used in such a method may be of any known type. Although the above examples assume movement of the machine tool spindle along only x, y and z axes, it should be noted that the spindle may also or alternatively be moveable about other axes. For example, the spindle may be rotatable about one or more axes. The machine tool may comprise a milling machine or a mill-turn machine (e.g. having 4 or 5 axes of movement). Furthermore, although movement of the spindle holding the probe is described it should be appreciated that the above methods could also be implemented by moving the workpiece relative to a fixed position probe.

The invention claimed is:

1. A method for measuring a workpiece on a machine tool comprising the steps of;
   (i) taking a workpiece having a nominal surface profile, said workpiece being located within the working area of a machine tool,
   (ii) using the machine tool to move an analogue probe having a deflectable stylus along a predetermined measurement path relative to the workpiece,
   (iii) measuring deflections of the stylus of the analogue probe as said analogue probe moves along said predetermined measurement path,
   wherein step (ii) comprises moving the analogue probe relative to the workpiece at a speed greater than five millimeters per second and wherein said predetermined measurement path provides intermittent contact between the stylus and the workpiece.

2. A method according to claim 1 wherein step (ii) comprises moving the analogue probe along a predetermined measurement path such that the stylus is spatially separated from the surface of the workpiece at one or more regions of the workpiece where the nominal surface profile of the workpiece exhibits a discontinuity.

3. A method according to claim 2 wherein step (ii) comprises moving the analogue probe along a predetermined measurement path such that the stylus is spatially separated from the surface of workpiece at each region of the workpiece where the nominal surface profile of the workpiece exhibits a discontinuity.

4. A method according to claim 2 wherein the stylus is spatially separated from the surface of workpiece at said one or more regions by no more than ten centimeters.

5. A method according to claim 1 wherein step (ii) comprises selecting a predetermined measurement path such that movement of the analogue probe relative to the workpiece is smooth and substantially jerk-free.

6. A method according to claim 1 wherein step (ii) comprises moving the analogue probe relative to the workpiece at a substantially constant tangential speed.

7. A method according to claim 1 wherein the predetermined measurement path is selected such that the stylus is brought back into contact with the workpiece at a shallow angle.

8. A method according to claim 1 wherein the predetermined measurement path comprises a closed profile portion.

9. A method according to claim 1 wherein the analogue probe is arranged to output deflection data relating to stylus deflection.

10. A method according to claim 9 comprising the step of outputting said deflection data to an associated interface over a wireless communications link.

11. A method according to claim 1 comprising the step of generating an enable signal that indicates when clean contact between the stylus and the workpiece surface is expected.

12. A method according to claim 1 comprising the step of calculating when clean contact between the surface of the workpiece and the stylus is made and lost.

13. A method according to claim 1 comprising the step of comparing the stylus deflection measured in step (iii) to an upper stylus deflection threshold.

14. A method according to claim 13 wherein the step of comparing the stylus deflection to an upper stylus deflection threshold is performed in real time.

15. A method according to claim 13 comprising the step of generating an over-deflection error signal when the measured stylus deflection exceeds the upper stylus deflection threshold.

16. A method according to claim 15 wherein the over-deflection error signal is passed to a user input of the numeric controller of the machine tool to allow machine tool movement to be stopped immediately.

17. A method according to claim 15 comprising the step of performing a recovery action when an over-deflection error signal is generated.

18. A method according to claim 17 wherein said recovery action comprises at least one of (a) cleaning or washing said workpiece, (b) re-machining said work piece, (c) altering the position of the workpiece within the machine tool work area and (d) regenerating the predetermined measurement path.

19. A method according to claim 17 comprising the step of re-measuring said workpiece after performing the recovery action.

20. A method according to claim 1 comprising the step of comparing the stylus deflection measured in step (iii) to a lower stylus deflection threshold.

21. A method according to claim 20 comprising the step of generating an under-deflection error signal when the measured stylus deflection is less than the lower stylus deflection threshold.

22. A method according claim 21 comprising the step of performing a recovery action when an under-deflection error signal is generated.

23. A method according to claim 1 comprising the step of calculating the predetermined measurement path used in step (ii) from the nominal shape of workpiece.

24. A method according to claim 1 comprising the step of determining the shape of at least one feature of the workpiece by combining stylus deflection data with data relating to the position of the probe relative to the workpiece.

25. A method according to claim 1 that comprises repeating steps (ii) and (iii) using a different predetermined measurement path.

26. A method according to claim 1 comprising the initial step of using the machine tool to cut a blank so as to form said workpiece having said nominal surface profile.

27. A method according to claim 1 comprising the step of providing an automated tool changer such that any one of a measurement probe and one or more cutting tools may be placed in the spindle of said machine tool.

28. A method according to claim 1 wherein step (ii) comprises moving the analogue probe relative to the workpiece at a speed greater than fifty millimeters per second.

29. A method according to claim 1 wherein step (ii) comprises moving the analogue probe relative to the workpiece at a speed greater than one hundred millimeters per second.

30. A method according to claim 1 wherein step (ii) comprises moving the analogue probe relative to the workpiece at a speed of around 250 millimeters per second.

31. A computer program that allows the method according to claim 1 to be implemented on a machine tool.

32. Machine tool apparatus comprising a workpiece holder, an analogue probe having a deflectable stylus, drive means for moving the analogue probe along a predetermined measurement path relative to the workpiece holder, and measurement means for measuring deflections of the stylus of the analogue probe as said probe is moved along said predetermined measurement path, wherein when a workpiece is held by the workpiece holder the drive means is arranged to move the analogue probe along a predetermined measurement path at a speed greater than five millimeters per second, wherein the predetermined measurement path is selected to provide intermittent contact between the stylus and the workpiece.

* * * * *